United States Patent Office 2,756,171
Patented July 24, 1956

2,756,171

SAFETY GLASS LAMINATE CONTAINING TRANSPARENT FILLER FOR SILICONE RESINS

Frederick L. Thomas, Madison, Wis., assignor to Bjorksten Research Laboratories, Inc., a corporation of Illinois No Drawing. Application July 31, 1952,
Serial No. 301,990

3 Claims. (Cl. 154—2.75)

This invention relates to safety glass laminates and particularly to such laminates which are suitable for use at high temperatures and comprise alkyl siloxanes.

In the past it has been a practice to employ various organic plastics or elastomers in order to provide an interlayer for safety glass laminates to prevent excessive spreading of glass particles when the glass is shattered. However, at temperatures in excess of 200° F. to 300° F. these safety glasses of prior art have been inadequate because of the lack of temperature resistance of interlayer materials employed. Certain derivatives of alkyl siloxanes have had the necessary resistance but these substances have not had any appreciable degree of transparency. They have been opaque and, therefore, totally unsuitable for practical use or they have been transparent and utterly lacking in tensile strength and heat resistance.

It is therefore an object of this invention to provide a safety glass laminate comprising alkyl siloxane resistant to high temperatures such as 500° F.

Another object is an alkyl siloxane plastic composition which is both transparent and highly resistant to high temperatures.

Another object is a reinforced transparent, flexible siloxane product.

Further objects will become apparent as the following detailed description proceeds.

Heretofore it has been known in the art that fillers, especially inorganic fillers, greatly increase the tensile strength and compression strength of siloxane elastomers when accompanied by known cross-linking agents such as organic peroxides, but this effect has been achieved only with opaque or translucent materials and transparent materials have not been obtained.

A substance such as glass is transparent en masse, but when crushed fine it becomes white, reflecting light from many tiny surfaces. However, if the crushed material is placed in a liquid such as water it again becomes transparent, each surface being wet by the liquid. Likewise, inorganic salts can appear transparent after they are immersed in the siloxane polymer although they appear opaque and white or yellow when crushed fine.

The transparent materials to which this invention relates are of this type, being typified by brittle inorganic crystalline particles dispersed in a transparent medium of entirely different characteristics to form a substance having properties quite different from those of either component.

In accordance with my invention, a heat resistant siloxane polymer is molded at 105° C. to 300° C. together with a free radical type catalyst such as, for example, benzoyl peroxide, di-tertiary butyl peroxide, acetyl peroxide, hydrogen peroxide, or sodium peroxide and a substance having an average particle size of about 20 microns or less, a refractive index ($n_D^{25}$) of 1.39 to 1.46 and having a cubic crystal lattice structure isotropic to light in the visible spectrum.

The product is both highly transparent and is resistant to high temperatures. It does not decompose or become substantially deformed at 500° F.

While I do not know the reason for this surprising effect, it is my belief that it is due to a specific interaction in the surface layer between the catalyst and the filler. The resin polymer, the filler and the catalyst probably all participate in the phenomenon.

The invention is further illustrated by the following specific examples which are given here by way of illustration and not in any sense of limitation.

*Example I*

2.5 parts of benzoyl peroxide and 45 parts of potassium cyanide which had an average particle size of about 15 microns were mixed intimately with 100 parts by weight of dimethyl polysiloxane polymer which had a viscosity of greater than 2,000,000 centipoises and which had been washed free of any acid. The resulting doughy mass was pressed into a sheet between sheets of aluminum foil under hydraulic pressure and at a temperature of 105° C.

A flexible, tough transparent film results which is resistant to high temperatures.

*Example II*

2.5 parts of benzoyl peroxide and 10 parts of calcium fluoride which had an average particle size of approximately 20 microns were mixed intimately on a rubber mill with 100 parts of dimethyl polysiloxane which had a viscosity of greater than 2,000,000 centipoises and which had been washed free of any acidic condensation catalyst. The resulting mixture was molded into a sheet between sheets of aluminum foil under hydraulic pressure and a temperature of 106° C.

A flexible, tough, transparent, slightly cloudy film results.

*Example III*

2.5 parts of finely ground benzoyl peroxide and 20 parts of lithium fluoride which had a maximum particle size of substantially 30 microns were intimately mixed with 100 parts of dimethyl polysiloxane as in the above examples, washed and pressed in a like manner.

A flexible, tough, slightly cloudy film results.

In the examples I have shown specific illustrations of three substances having a particle size of from 2 to 50 microns in diameter, having a refractive index of 1.39 to 1.46 at 25° C. referred to the sodium D line and having a cubic crystal lattice structure isotropic to light in the visible spectrum, namely: potassium cyanide, having an average particle size of about 15 microns; calcium chloride, having an average particle size of about 20 microns; and lithium chloride, having a maximum particle size of substantially 30 microns. A particle size of about 10 microns is the lower limit of size preferable for my invention, although it is operable with particles of a size as small as about 2 microns. Similarly a maximum size of about 35 microns is preferable, and a size of about 50 microns is the largest which operates well with my invention, although particles of 100 or 200 microns diameter may suitably be used. The ratio of filler to polysiloxane may be from about 5% to about 80%.

In addition to the specific compounds which have been shown in the examples, others are also suitable. The class of compounds which is suitable includes lithium fluoride, potassium fluoride, sodium fluoride, rubidium fluoride, and cesium fluoride, being all of the alkali metal fluorides; calcium fluoride, strontium fluoride and barium fluoride, being the fluorides of alkaline earth metals having an atomic weight less than 138; lithium chloride; calcium chloride; lithium cyanide, sodium cyanide, potassium cyanide, rubidium cyanide, and cesium cyanide, being the cyanides of all the alkali metals; potassium tetracyanozincate IV; potassium tetracyanocadmate II;

potassium tetracyanozincate II; potassium tetracyanomercurate II; potassium heptafluohafniate IV; potassium heptafluozirconate IV; ammonium heptafluohafniate IV; ammonium heptafluozirconate IV; such glasses as opal glass, silica glass and boron oxide glass; the double salt of ytterbium erbium cerium fluoride with calcium fluoride and one molecule of water of hydration; calcium ytterbium fluoride; the multiple salt having the formula $(Na_2Mg)F_2 \cdot 3Al(FOH)_3 \cdot 2H_2O$; potassium fluosilicate; barium calcium propionate; sodium di-acetate; and the triple salt having the formula $(Na_2SO_4)_2 \cdot NaCl \cdot NaF$.

It is thus seen that the invention is broad in scope, and is not to be restricted excepting by the claims, in which it is my intention to cover all novelty inherent in the invention as broadly as possible, in view of prior art.

Having thus disclosed by invention, I claim:

1. A transparent laminate comprising sheets of glass having laminated thereinbetween an interlayer essentially consisting of a heat resistant organopolysiloxane characterized by being transparent and containing therein a filler substance having a particle size of from 2 to 50 microns diameter, having a refractive index of 1.39 to 1.46 at 25° C. referred to the sodium D line and having a cubic crystal lattice structure isotropic to light in the visible spectrum, said filler substance being selected from the group consisting of fluorides of alkaline earth metals having atomic weight less than 138 and alkali metals.

2. The composition of claim 1 in which said filler substance is lithium fluoride.

3. The composition of claim 1 in which said filler substance is calcium fluoride.

References Cited in the file of this patent

UNITED STATES PATENTS

| Number | Name | Date |
|---|---|---|
| 2,304,754 | Wainer | Dec. 8, 1942 |
| 2,389,491 | Dunlap | Nov. 20, 1945 |
| 2,502,286 | Sowa | Mar. 28, 1950 |
| 2,504,388 | Braley | Apr. 18, 1950 |
| 2,541,137 | Warrick | Feb. 13, 1951 |
| 2,596,085 | Wormuth | May 6, 1952 |
| 2,601,337 | Smith-Johnnsen | June 24, 1952 |